US008769055B2

(12) United States Patent
Murphy et al.

(10) Patent No.: US 8,769,055 B2
(45) Date of Patent: Jul. 1, 2014

(54) DISTRIBUTED BACKUP AND VERSIONING

(75) Inventors: Elissa E. S. Murphy, Seattle, WA (US); Navjot Virk, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 165 days.

(21) Appl. No.: 12/430,012

(22) Filed: Apr. 24, 2009

(65) Prior Publication Data

US 2010/0274765 A1 Oct. 28, 2010

(51) Int. Cl.

| | |
|---|---|
| ***G06F 15/177*** | (2006.01) |
| ***G06F 11/16*** | (2006.01) |
| ***G06F 12/00*** | (2006.01) |
| ***G06F 12/16*** | (2006.01) |
| ***G06F 17/30*** | (2006.01) |
| ***H04L 29/08*** | (2006.01) |
| *G06F 3/06* | (2006.01) |

(52) U.S. Cl.

CPC ......... *H04L 67/1002* (2013.01); *H04L 67/1095* (2013.01); *H04L 67/1097* (2013.01); *G06F 3/065* (2013.01)

USPC ........... 709/220; 709/219; 709/217; 707/634; 707/637; 707/638; 711/161; 711/162

(58) Field of Classification Search

CPC .................................................. H04L 67/1002

USPC ......................................................... 709/220

See application file for complete search history.

(56) References Cited

U.S. PATENT DOCUMENTS

| | | | |
|---|---|---|---|
| 5,239,647 | A | 8/1993 | Anglin et al. |
| 5,410,671 | A | 4/1995 | Elgamal et al. |
| 5,701,480 | A | 12/1997 | Raz |
| 5,924,096 | A | 7/1999 | Draper et al. |
| 5,987,506 | A | 11/1999 | Carter |
| 6,167,427 | A | 12/2000 | Rabinovich et al. |

(Continued)

FOREIGN PATENT DOCUMENTS

| | | |
|---|---|---|
| JP | 200659308 | 9/1994 |
| JP | 2003-280950 | 10/2003 |

(Continued)

OTHER PUBLICATIONS

Kangarashu et al—Adaptive Content Management in Structured P2P Communities, International Conference on Scalable Information Systems, Hong Kong (2006).*

(Continued)

*Primary Examiner* — David Lazaro
*Assistant Examiner* — Robert Shaw
(74) *Attorney, Agent, or Firm* — Bryan Webster; David Andrews; Micky Minhas

(57) ABSTRACT

The claimed subject matter provides a system and/or a method that facilitates distributed backup and versioning techniques for network-based backup architectures. When data is committed to a backup system, a backup version can be created. The generated backup version can be a complete rendition of data or the generated backup version can be a differential between the data and backup information previously committed to the system. The generated backup version can be replicated across a distributed network of peers. Replication can be based upon a desire level of redundancy of versions, location of peers, network topology of peers, storage capacity of peers, health of peers, type of peer, and the like. In addition, versions can be retained based upon a configurable number of desired versions.

19 Claims, 11 Drawing Sheets

(56) References Cited

U.S. PATENT DOCUMENTS 6,256,675 B1 * 7/2001 Rabinovich .................. 709/241
6,405,219 B2 6/2002 Saether et al.
6,463,454 B1 10/2002 Lumelsky et al.
6,466,980 B1 10/2002 Lumelsky et al.
6,516,350 B1 2/2003 Lumelsky et al.
6,728,849 B2 4/2004 Kodama
6,785,786 B1 8/2004 Gold et al.
6,880,002 B2 * 4/2005 Hirschfeld et al. .......... 709/223
6,950,871 B1 9/2005 Honma et al.
7,020,665 B2 3/2006 Douceur et al.
7,023,974 B1 4/2006 Brannam et al.
7,054,910 B1 * 5/2006 Nordin et al. ................ 709/208
7,103,740 B1 9/2006 Colgrove et al.
7,136,903 B1 11/2006 Phillips et al.
7,155,463 B1 * 12/2006 Wang et al. .................. 707/634
7,159,050 B2 1/2007 Miyata et al.
7,219,191 B2 5/2007 Takamoto et al.
7,370,336 B2 5/2008 Husain et al.
7,383,381 B1 6/2008 Faulkner et al.
7,392,421 B1 * 6/2008 Bloomstein et al. .......... 714/4.4
7,461,230 B1 12/2008 Gupta et al.
7,529,785 B1 * 5/2009 Spertus et al. ....................... 1/1
7,539,708 B2 5/2009 Oosaki et al.
7,555,527 B1 * 6/2009 Slaughter et al. ............ 709/213
7,636,764 B1 * 12/2009 Fein et al. .................... 709/212
7,653,668 B1 * 1/2010 Shelat et al. ................. 707/610
7,657,582 B1 * 2/2010 Cram et al. .................. 707/640
7,685,109 B1 * 3/2010 Ransil et al. .......... 707/999.003
7,693,877 B1 4/2010 Zasman
7,739,233 B1 6/2010 Ghemawat et al.
7,761,456 B1 * 7/2010 Cram et al. .................. 707/754
7,783,600 B1 * 8/2010 Spertus et al. ............... 707/622
7,805,407 B1 * 9/2010 Verbeke et al. .............. 707/634
7,827,214 B1 11/2010 Ghemawat et al.
7,836,017 B1 11/2010 Srinivasan et al.
7,853,669 B2 * 12/2010 Moromisato et al. ......... 709/217
7,925,623 B2 * 4/2011 Therrien et al. ............. 707/610
7,941,619 B1 5/2011 Rossi
8,239,479 B2 * 8/2012 Sagar et al. .................. 370/503
2002/0116251 A1 * 8/2002 Chen et al. ...................... 705/10
2002/0156974 A1 * 10/2002 Ulrich et al. ................. 711/114
2003/0056139 A1 3/2003 Murray et al.
2003/0105810 A1 6/2003 McCrory et al.
2003/0110263 A1 6/2003 Shillo
2003/0135514 A1 * 7/2003 Patel et al. ................... 707/102
2003/0167295 A1 9/2003 Choo
2003/0177176 A1 * 9/2003 Hirschfeld et al. .......... 709/203
2003/0212872 A1 11/2003 Patterson et al.
2003/0233455 A1 * 12/2003 Leber et al. .................. 709/226
2004/0003107 A1 1/2004 Barham et al.
2004/0030731 A1 2/2004 Iftode et al.
2004/0047354 A1 3/2004 Slater et al.
2004/0049700 A1 3/2004 Yoshida
2004/0064633 A1 4/2004 Oota
2004/0088331 A1 5/2004 Therrien et al.
2004/0122741 A1 6/2004 Sidman
2004/0139222 A1 * 7/2004 Slik et al. ..................... 709/236
2004/0193659 A1 9/2004 Carlson
2004/0210591 A1 10/2004 Hirschfeld et al.
2005/0108565 A1 5/2005 Blea et al.
2005/0120058 A1 6/2005 Nishio
2005/0132257 A1 6/2005 Gold et al.
2005/0144195 A1 * 6/2005 Hesselink et al. ............ 707/201
2005/0154697 A1 * 7/2005 Altaf et al. ........................ 707/1
2005/0193239 A1 9/2005 Shackelford
2005/0246398 A1 11/2005 Barzilai et al.
2005/0262097 A1 * 11/2005 Sim-Tang et al. ............... 707/10
2005/0283487 A1 * 12/2005 Karlsson et al. .............. 707/100
2006/0010169 A1 1/2006 Kitamura
2006/0053139 A1 * 3/2006 Marzinski et al. ............ 707/101
2006/0064416 A1 * 3/2006 Sim-Tang ........................ 707/6
2006/0149901 A1 7/2006 Sasage et al.
2006/0161635 A1 7/2006 Lamkin et al.
2006/0168154 A1 7/2006 Zhang et al.
2006/0179061 A1 8/2006 D'Souza et al.
2006/0190243 A1 8/2006 Barkai et al.
2006/0230076 A1 * 10/2006 Gounares et al. ............. 707/200
2006/0242155 A1 10/2006 Moore et al.
2006/0253504 A1 11/2006 Lee et al.
2006/0265490 A1 * 11/2006 Pishevar et al. ............... 709/223
2006/0271530 A1 11/2006 Bauer
2006/0271601 A1 * 11/2006 Fatula et al. ................. 707/201
2007/0027916 A1 2/2007 Chen et al.
2007/0043787 A1 2/2007 Cannon et al.
2007/0079004 A1 4/2007 Tatemura et al.
2007/0083725 A1 4/2007 Kasiolas et al.
2007/0094269 A1 * 4/2007 Mikesell et al. ................ 707/10
2007/0113032 A1 * 5/2007 Kameyama et al. .......... 711/162
2007/0136541 A1 6/2007 Herz et al.
2007/0143371 A1 6/2007 Kottomtharayil
2007/0207729 A1 9/2007 Chen et al.
2007/0208748 A1 9/2007 Li
2007/0244894 A1 10/2007 St. Jacques
2007/0244920 A1 * 10/2007 Palliyil et al. ................ 707/102
2007/0245103 A1 * 10/2007 Lam et al. .................... 711/161
2007/0250519 A1 10/2007 Fineberg et al.
2007/0294719 A1 12/2007 Jost
2008/0005334 A1 * 1/2008 Utard et al. .................. 709/226
2008/0052328 A1 2/2008 Widhelm et al.
2008/0065704 A1 * 3/2008 MacCormick et al. ....... 707/204
2008/0104107 A1 5/2008 Schwaab et al.
2008/0147836 A1 6/2008 Littlefield et al.
2008/0178179 A1 7/2008 Natarajan et al.
2008/0183891 A1 * 7/2008 Ni et al. ....................... 709/239
2008/0198752 A1 * 8/2008 Fan et al. ..................... 370/238
2008/0209144 A1 8/2008 Fujimoto
2008/0215663 A1 * 9/2008 Ushiyama .................... 709/201
2008/0222154 A1 * 9/2008 Harrington et al. ............ 707/10
2008/0222346 A1 9/2008 Raciborski et al.
2008/0235331 A1 9/2008 Melamed et al.
2008/0256138 A1 * 10/2008 Sim-Tang .................... 707/202
2008/0301132 A1 12/2008 Yamada et al.
2008/0317068 A1 * 12/2008 Sagar et al. .................. 370/503
2009/0007241 A1 * 1/2009 Tewari et al. ..................... 726/4
2009/0164533 A1 * 6/2009 Hubbard ....................... 707/204
2009/0182955 A1 7/2009 Cherukuri
2009/0198825 A1 * 8/2009 Miller et al. .................. 709/230
2009/0222498 A1 9/2009 Lu et al.
2009/0234917 A1 * 9/2009 Despotovic et al. .......... 709/204
2009/0265473 A1 * 10/2009 Hydrie et al. ................. 709/229
2009/0276771 A1 * 11/2009 Nickolov et al. ............. 717/177
2009/0292871 A1 11/2009 Watanabe et al.
2009/0300079 A1 12/2009 Shitomi
2010/0034211 A1 2/2010 Yanagihara

FOREIGN PATENT DOCUMENTS

JP 2004046874 A * 12/2004 ............. G06F 13/00
JP 2005-215735 8/2005
JP 2006-350470 12/2006
JP 200701840 A * 1/2007 ................ G06F 3/06
JP 2007018407 A * 1/2007 ................ G06F 3/06
WO 2004/053696 6/2004
WO WO-2007088084 A2 * 1/2007 ............. G06F 17/30
WO 2007088084 8/2007

OTHER PUBLICATIONS

Zhao et al., Tapestry: An Infrastructure for Fault-tolerant Wide Area Location and Routing, Report No. UCB/CSD-01-1141, Apr. 2001.*

Weatherspoon et al—Introspective Failure Analysis: Avoiding Correlated Failures in Peer-to-Peer Systems, IEEE (2002).*

Xiao et al , Distributed Proximity-Aware Peer Clustering in BitTorrent-Like Peer-to-Peer Networks, in: EUC 2006, LNCS 4096, SpringerLink (2006) pp. 375-384.*

Ranganathan and Foster, Identifying Dynamic Replication Strategies for a High-Performance Data Grid, LNCS 2242, Springer-Verlag, 2001, pp. 75-86.*

Ranganathan et al. Improving Data Availability through Dynamic Model-Driven Replication in Large Peer-to-Peer Communities, Proceedings of the 2nd IEEE/ACM International Symposium on Cluster Computing and the Grid (CCGRID.02), 2002.*

(56) References Cited

OTHER PUBLICATIONS

Kangarasharju et al—Adaptive Content Management in Structured P2P Communities, International Conference on Scalable Information Systems, Hong Kong (2006).*
Mao et al. "QoS oriented dynamic replica cost model for P2P computing," Distributed 25th IEEE International Conference on Computing Systems Workshops, Jun. 2005.*
Ripeanu and Foster, A Decentralized, Adaptive Replica Location Mechanism, Proceedings of the 11th IEEE International Symposium on High Performance Distributed Computing (HPDC-11), 2002.*
LoPresti et al. , Dynamic Replica Placement in Content Delivery Networks, Proceedings of the 13th IEEE International Symposium on Modeling, Analysis, and Simulation of Computer and Telecommunication Systems (MASCOTS'05), 2005.*
Szymaniak et al, "Latency-Driven Replica Placement", Szymaniak et al, Latency-Driven Replica Placement, IEEE International Symposium on Applications and the Internet, (Feb. 2005) source: http://www.globule.org/publi/LDRP_saint2005-2.pdf.*
L. Qiu, V. Padmanabhan, and G. Voelker. On the Placement of Web Server Replicas. In Proceedings of IEEE INFOCOM, Apr. 2000, pp. 1587-1596.*
Ye & Chiu, "Peer-to-Peer Replication with Preferences", InfoScale 2007, Jun. 6-8, 2007, Suzhou, China, ACM (2007).*
Karlsson and Karamanolis, Bounds on the Replication Cost for QoS,HP Tech.Report HPL-2003-156, (Jul. 2003).*
Karlsson and Karamanolis, Choosing Replica Placement Heuristics for Wide-Area SystemProceedings of the 24th International Conference on Distributed Computing Systems (ICDCS'04), IEEE, 2004.*
Bartolini et al "Optimal dynamic replica placement in Content Delivery Networks," in Proceedings of the 11th IEEE International Conference on Networks, ICON 2003, (Sydney, Australia), pp. 125-130, Sep. 28-Oct. 1, 2003.*
R. Casey, Allocation of a file in an information network, AFIPS (1972).*
Dowdy & Foster, Comparative Models of the File Assignment Problem, ACM Computing Surveys, vol. 14, No. 2, (Jun. 1982).*
K. Chandy and J. Hewes, "File Allocation in Distributed Systems," in Proceedings of the International Symposium on Computer Performance Modeling, Measurement and Evaluation, Mar. 1976, pp. 10-13.*
M. Rabinovich and A. Aggarwal, "RaDaR: A Scalable Architecture for a Global Web Hosting Service," in Proceedings of the 8th International World Wide Web Conference, May 1999, pp. 1545-1561.*
Rabinovich et al "Dynamic Replication on the Internet", AT&T Labs (Mar. 1998).*
Mahmoud & Riordon, Optimal Allocation of Resources in Distributed Information Networks, ACM Transactions on Database Systems, vol. 1, No. 1, Mar. 1976, pp. 66-78.*
Tewari & Adam, Distributed File Allocation with Consistency Constraints, IEEE, Proceedings of the International Conference on Distributed Computing (1992), pp. 408-415.*
Androutsellis-Theotokis and Spinellis, A Survey of Peer-to-Peer Content Distribution Technologies, ACM Computing Surveys, vol. 36, No. 4, Dec. 2004, pp. 335-371.*
Loukopoulos and Ahmad, "Static and adaptive distributed data replication using genetic algorithms" in Journal of Parallel Distributed Computing 64 (2004) pp. 1270-1285.*
Chu et al—Optimal File Allocation in a Multiple Computer System, IEEE Transactions on Computers, vol. C-18, No. 10, Oct. 1969, pp. 885-889.*
On et al. "QoS-Controlled Dynamic Replication in Peer-to-Peer Systems", Proceedings of Third International Conference on Peer-to-Peer Computing, 2003.*
Karlsson et al A Framework for Evaluating Replica Placement Algorithms, HP Tech.Report HPL-2002-219 (Aug. 2002 ).*
Zhipeng & Dan, Dynamic Replication Strategies for Object Storage Systems in: EUC Workshops 2006, LNCS 4097, SpringerLink (2006) pp. 53-61.*
Notice of Allowance and Fee(s) Due mailed Jul. 22, 2013 in U.S. Appl. No. 12/430,018; 4 pages.
Final Office Action mailed Jun. 5, 2013 in U.S. Appl. No. 12/430,015; 119 pages.
Final Office Action mailed Jun. 10, 2013 in U.S. Appl. No. 12/430,010; 99 pages.
Non-Final Office Action mailed Oct. 23, 2012 re U.S. Appl. No. 12/430,010, 198 pages.
Tang & Yang, Technical Report 2002-32, UCSB, Nov. 2002.
Karlson et al., A Framework for Evaluating Replica Placement Algorithms, HP Tech Report PHL-2002-219 (Aug. 2002), 13 pages.
Bartolini et al. Optimal Dynamic Replica Placement in Content Delivery Networks, pp. 125-130 (6 pages).
Xiao et al., Distributed Proximity-Aware Peer Clustering in BioTorrent-Like Peer-to-Peer Networks, E. Sha et al. (eds.): EUC 2006, LNCS 4096, pp. 375-384, 2006.
Chandy et al., File Allocation in Distributed Systems, Joint International Conference on Measurement and Modeling of Computer Systems Proceedings of the 1976 ACM SIGMETRICS conference on Computer Performance Modeling Measurement and Evaluation, Cambridge, MA, 1976, pp. 10-13.
Rabinovich et al., Dynamic Replication on the Internet Work Project No. 3116-17-1706, AT&T Labs Research, p. 1-35.
Rabinovich et al., RaDaR: a scalable architecture for a global Web hosting service, Computer Networks 31 (1999) 1545-1561.
Casey, Allocation of a File in an Information Network, Proceedings of the May 16-18, 1972, Spring Joint Computer Conference (Atlantic City, NJ May 16-18, 1972). AFIPS '72 (Spring)m ACM, New York, NY, pp. 617-625.
Mahmoud, et al., Optimal Allocation of Resources in Distributed Information Networks, ACM Transactions on Database Systems, vol. 1, No. 1, Mar. 1976, pp. 66-78.
Non-Final Office Action mailed Nov. 7, 2012, 504 pages.
Final Office Action mailed Nov. 30, 2012 in U.S. Appl. No. 12/430,018; 96 pages.
Kaczmarski, Jiang & Pease, "Beyond backup toward storage management", IBM Systems Journal, vol. 42, No. 2, 2003, pp. 322-337.
Tang & Yang, Differentiated Object Placement for Self-Organizing Storage Clusters, Technical Report 2002-32, UCSB, (Nov. 2002).
Tang et al—Sorrento: A Self-Organizing Storage Cluster for Parallel Data-Intensive Applications, Technical Report 2003-30, UCSB, (2003).
Mao et al. "OoS oriented dynamic replica cost model for P2P computing," Distributed 25th IEEE International Conference on Computing Systems Workshops, Jun. 2005.
Dilley et al. "Globally Distributed Content Delivery", IEEE Internet Computing, IEEE (Sep.-Oct. 2002) p. 50-58.
Phan et al. "Evolving Toward the Perfect Schedule: Co-scheduling Job Assignments and Data Replication in Wide-Area Systems Using a Genetic Algorithm," 11th Workshop on Job Scheduling Strategies for Parallel Processing, Cambridge Mass., Jun. 2005.
Sanchez-Artigas et al., "A Comparative Study of Hierarchical DHT Systems" in: 32nd IEEE Conference on Local Computer Networsk, IEEE (2007).
L. Garces-Ercie et al. "Hierarchical P2P Systems," ACM/IFIP Conference on Parallel and Distributed Computing (Euro-Par), 2003.
J- Kangasharju, K.W. Ross, and D.A. Turner, Optimal Content Replication in P2P Communities, 2002.
Jorden, E., Project Prioritization and Selection: The Disaster Scenario, in Proceedings of the 32nd Annual Hawaii Internaitonal Conference on Systems Sciences (HICSS-32), Maui, Hawaii, Jan. 1999.
Abawajy, Placement of File Replicas in Data Grid Environment ICCS 2004, LNCS 3038, Springer-Verlag, 2004, pp. 66-73.
Stockinger, H., Samar, A., Allcock, B. Foster, I., Holtman, K., Tierney, B.: File and Object Replication in Data Grids, 10th IEEE Symposium on High Performance and Distributed Computing (2001).
Hoschek, W., Janez, F.J. Samar, A., Stockinger, H., Stockinger, K.: Data Management in an International Data Grid Project, Proceedings of GRID Workshop (2000) 77-90.
Translation of JP 2005-201248-A, Ichikawa, Hiroyuk (Jan. 2007), 37 pages.
Dimakis et al., Nortwork Cording for Distributed Systems (Mar. 2008).

(56) References Cited

OTHER PUBLICATIONS

Szymaniak et al, "Latency-Driven Replica Placement", IPSJ Journal, (Aug. 2006) source: http://www.globule.org/publi/LDRP_ipsj2006.html.
Feng Mao; Hai Jin; Deqin Zou; Baoli Chen; Li Qi;, "QoS Oriented Dynamic Replica Cost Model for P2P Computing," Distributed 25th IEEE International Conference on Computing Systems Workshops, Jun. 6-10, 2005 pp. 822-828.
Ellard et al., Attribute-Based Prediction of File Properties, Tech. Report TR-14-03, Harvard University, Cambridge, MA, 2004.
Ye and Chiu, Peer-to_Peer Replication With Preferences, Infoscale 2007 Jun. 6-8, 2007, Suzhou, China, ACM, 2007.
On et al, "Quality of Availability: Replica Placement for Widely Distributed Systems", Proceedings of the 11th International Conference on Quality of Service (IWQoS2003), Lecture Notes in Computer Science 2707 Springer-Verlag (2003), pp. 324-352.
Rabin, "Efficient Dispersal of Information for Security, Load Balancing, and Fault Tolerance", Journal of the Association for Computing Machinery, vol. 36, No. 2, Apr. 1989, pp. 335-348.
Dowdy and Foster, Comparative Models of the File Assignment Problem, Computing Survey, vol. 14, No. 2, ACM, Jun. 1982, 287-303.
Karlsson and Karamanolis, "Bounds on the Replication Cost for QoS" Technical Report HPL-2003-156, Hewlett Packard Labs, Jul. 2003.
Tang and Yang, Differentiated Object Placement for Self-Organizing Storage Cluster, UCSB, 2002.
Compellent Technologies Inc. Datasheet of Data Progression Storage Center, 2008, http://www.mgbsinc.com/NEWSITEFILES/Compellent/MGBS-Compellent-Data Progression-2008.pdf.
Final Office Action mailed Mar. 26, 2012 re U.S. Appl. No. 12/430,015, 70 pages.
Office Action mailed May 23, 2011 re U.S. Appl. No. 12/430,018, 96 pages.
Office Action mailed Jun. 21, 2011 re U.S. Appl. No. 12/430,015, 83 pages.
Office Action mailed Jul. 25, 2011 re U.S. Appl. No. 12/430,010, 69 pages.
Final Office Action mailed Feb. 1, 2012 re U.S. Appl. No. 12/430,018, 100 pages.
Final Office Action mailed Mar. 28, 2012 re U.S. Appl. No. 12/430,010, 57 pages.
Office Action mailed Jun. 18, 2012 re U.S. Appl. No. 12/430,018, 97 pages.
PCT Appl. No. PCT/US2010/031942, Search Report Dated Nov. 8, 2010, 3 pages.
PCT Appl. No. PCT/US2010/031939, Search Report Dated Nov. 30, 2010, 4 pages.
PCT/Appl. No. PCT/US2010/031939 Written Opinion, dated Nov. 30, 2010, 5 pages.
PCT/Appl. No. PCT/US2010/031939 International Preliminary Report on Patentability, dated Oct. 25, 2011, 6 pages.
PCT/App. No. PCT/US2010/031942, Written Opinion, dated Nov. 8, 2010, 4 pages.
PCT/App. No. PCT/US2010/031942, International Preliminary Report on Patentability, dated Oct. 25, 2011, 5 pages.
Oracle, Oracle Database Backup in the Cloud, http://www.oracle.com/technology/tech/cloud/pdf/cloud-backup-whitepaper.pdf, 12 pages, Sep. 2008.
Barr, et al., pStore: A Secure Distributed Backup System, http://kbarr.net/static/pstore/progress.pdf, 10 pages.
Distributed Version Control and Library Metadata, http://journal.code4lib.org/articles/86, last accessed Jan. 22, 2009, 9 pages.
Peer-to-Peer Replication, http://publib.boulder.ibm.com/infocenter/db2luw/v9r5/index.jsp?topic=/com.ibm.swg.im.iis.repl.qrepl.doc/topics/iiyrqsubcp2pconc.html, last accessed Jan. 22, 2009, 5 pages.
Auvray,Distributed Version Control Systems: A Not-So-Quick Guide Through, http://www.infoq.com/articles/dvcs-guide, last accessed Jan. 22, 2009, 18 pages.
Stefansson, MyriadStore: A Peer-to-Peer Backup System, http://myriadstore.sics.se/docs/mstorethesis.pdf, Jun. 2006, 86 pages.
Li, et al., Erasure Resilient Codes in Peer-to-Peer Storage Cloud, http://ieeexplore.ieee.org/stamp/stamp.jsp?arnumber=01660948 4 pages.
DFSgc: Distributed File System for Multipurpose Grid Applications and Cloud Computing, http://www.cyfronet.pl/cgw08/presentations/c2-4.pdf, 18 pages.
Harris, De-duplicating Primary Storage, http://storagemojo.com/2008/09/30/de-duplicating-primary-storage/, last accessed on Jan. 22, 2009 18 pages.
Graham, Cloud Optimized Storage Solutions: Neural Networks and Heuristics, http://flickerdown.com/2009/01/cloud-optimized-storage-solutions-neural-networks-and-heuristics/, Jan. 19, 2009, 10 pages.
Storage Optimization, http://storageoptimization.wordpress.com/, last accessed on 1-22-099 9 pages.
Backup, the New Storage Tiers and Real Snapshots, http://blogs.netapp.com/extensible_netapp/iops/index.html, Dec. 15, 2008, 5 pages.
Distributed Backup Solution for Corporate Networks, http://www.handybackup.net/distributed-backup-system.shtml, last accessed on 1-22-099 2 pages.
Douceour, Large-scale Simulation of Replica Placement Algorithms for a Sewerless Distributed File System, http://ieeexplore.ieee.org/stamp/stamp.jsp?arnumber=948882&isnumber=20512, Jan. 22, 2009, 10 pages.
McCue, et al., Computing Replica Placement in Distributed Systems, http://ieeexplore.ieee.org/stamp/stamp.jsp?arnumber=242617&isnumber=6238, Jan. 22, 2009, 4 pages.
MacCormick, et al., Kinesis: A New Approach to Replica Placement in Distributed Storage Systems, http://research.microsoft.com/pubs/76149/Kinesis.pdf, 14 pages.
Yu, et al., Minimal Replication Cost for Availability, http://www.comp.nus.edu.sg/~yuhf/podc02.pdf, 10 pages.
Chen, et al. SCAN: A Dynamic, Scalable, and Efficient Content Distribution Network, http://sahara.cs.berkeley.edu/papers/CKK02b.ps, 15 pages.
Presti, et al. Dynamic Replica Placement in Content Delivery Networks, http://ieeexplore.ieee.org/stamp/stamp.jsp?arnumber=01521155, 10 pages.
Chun, et al. Efficient Replica Maintenance for Distributed Storage Systems, http://oceanstore.cs.berkeley.edu/publications/papers/pdf/carbonite06.pdf, 14 pages.
Notice of Allowance mailed Feb. 20, 2014, U.S. Appl. No. 12/430,015, 99 pages.
Japanese Office Action dated Jan. 15, 2014 re 2012-507360,3 pages.
Japanese Office Action dated Dec. 25, 2013 re App. No. 2012-507361.

* cited by examiner

DISTRIBUTED BACKUP AND VERSIONING

BACKGROUND

As computing devices become more prevalent and widely used among the general population, the amount of data generated and utilized by such devices has rapidly increased. For example, recent advancements in computing and data storage technology have enabled even the most limited form-factor devices to store and process large amounts of information for a variety of data-hungry applications such as document editing, media processing, and the like. Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based backup, which allow a user of a computing device to maintain one or more backup copies of data associated with the computing device at a remote location on a network.

Existing system and/or data backup solutions enable a user to store backup information in a location and/or media separate from its original source. Thus, for example, data from a computing device can be backed up from a hard drive to external media such as a tape drive, an external hard drive, or the like. However, in an implementation of network-based backup and/or other solutions that can be utilized to provide physically remote locations for storing backup data, costs and complexity associated with transmission and restoration of user data between a user machine and a remote storage location can substantially limit the usefulness of a backup system. For example, in the case where backup data is stored at a remote network location, data associated with respective versions of an original copy of a file and/or system image can be transmitted to remote storage, where the respective versions can later be retrieved for restoration. However, a sizeable amount of data is generally transmitted over the network in such an example, thereby consuming expensive bandwidth. In view of the foregoing, it would be desirable to implement network-based backup techniques with improved efficiency.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methodologies that facilitate distributed backup and versioning techniques for network-based backup architectures. When data is committed to a backup system, a backup version can be created. The generated backup version can be a complete rendition of data or the generated backup version can be a differential between the data and backup information previously committed to the system. The generated backup version can be replicated across a distributed network of peers (e.g., user devices). Replication can be based upon a desired level of redundancy of versions, location of peers, network topology of peers, storage capacity of peers, health of peers, type of peer, and the like. In addition, versions can be retained based upon a configurable number of desired versions.

In accordance with one aspect, a hybrid backup architecture can be employed wherein backup data and/or versions of backup data can be retained on a global location within a network or internetwork (e.g., a "cloud") as well as one or more peers. Accordingly, some or all versions can be obtained from either the cloud or a nearby peer, thus reducing latency and bandwidth consumption associated with restore operations. In one example, selection of locations to be utilized for storing and/or retrieving backup information (e.g., backup versions) can be selected in an intelligent and automated manner based on factors such as, but not limited to, availability of locations, network topology, location resources, or so on.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
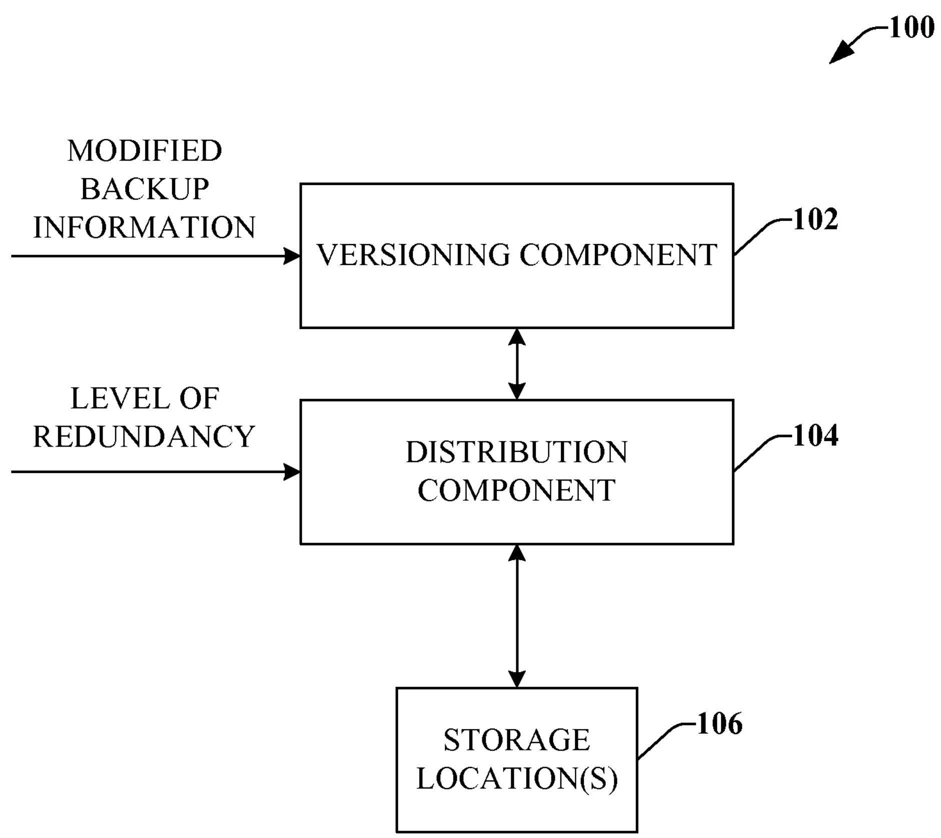
FIG. 1 illustrates a block diagram of an example system that facilitates employing a distributed backup information versioning mechanism in accordance with various aspects.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "cloud," "peer," "super peer," "client," and the like are intended to refer to a computer-related entity, either hardware, software in execution on hardware, and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a system 100 that facilitates employing a distributed backup information versioning mechanism in accordance with various aspects. In one example, system 100 can be utilized to backup a current version of files, system images and/or other data on a client machine that implements and/or is otherwise associated with system 100, wherein at least one previous version is retained by a backup system. In an aspect, the client machine can be a personal computer, a laptop computer, a server, a portable digital assistant (PDA), a mobile device, a smart phone, a cell phone, a portable gaming device, a media player or any other suitable computing device that can store, manipulate and/or transfer data.

In accordance with one aspect, system 100 can be utilized in connection with a network-based or online backup solution (e.g., a cloud backup system, as described in further detail infra) that stores backup information from a client machine at one or more remote storage locations on a network or internetwork to which the client machine is associated. Conventional online backup solutions operate by maintaining a set of files obtained from a backup client at various points in time at a remote storage location. Subsequently, restoration is conducted by retrieving one or more files from the storage locations as requested.

To increase redundancy of stored information, backup systems can retain multiple copies of backup information. For example, a conventional backup system can store multiple copies of backup information in an online storage location (e.g., the cloud). Such conventional systems can result in increased storage resource utilization as the online storage location becomes loaded with multiple copies of backup information. In addition, conventional online backup solutions can include versioning mechanisms such that different versions of files, images or other data are stored. When a file is modified in a manner that differentiates the file from a previously backed up version, a new version can be created and backed up. Conventionally, multiple versions can be stored and retrieved to enable rolling a file or other information back to a particular version. However, to provide redundancy, conventional online backup solutions can store multiple copies of multiple versions at an online storage location. Such concentration of copies and versions can lead to large and inefficient utilization of storage.

Accordingly, to provide increased redundancy as well as lower and efficient resource utilization, system 100 can facilitate integration of a versioning mechanism in a distributed backup solution. More particularly, when user, on a client machine, modifies a file or other information corresponding to data managed (e.g., stored) by a backup system (e.g., backup information), a versioning component 102 can be employed to automatically generate a new backup version. The new backup version can be a complete rendition of the modified file or other information. In accordance with another aspect, the new backup version can include an incremental update that reflects changes between a current version (e.g., a version with the user modifications) and a previous version managed by the backup system. The incremental update can include changes solely between the current version and an immediate predecessor version. In another example, the incremental update can reflect all changes between the current version and an original version (e.g., a first version to be stored by the backup system) or an intervening version between the original version and the current version.

In accordance with another aspect, upon generation of a new backup version that reflects modifications to a file or other information made by a user, a distribution component 104 can be employed to replicate the new backup version across one or more storage locations 106. In one example, the distribution component 104 can disseminate the new backup version in an intelligent (e.g., statistically derived) manner. For instance, the distribution component 104 can dispense the new backup version to one or more storage locations 106 based upon a level of redundancy. In an example, the level of redundancy can indicate that three replicas of versions are to be scattered among the storage locations 106. It is to be appreciated that the level of redundancy can be configurable either automatically by system 100 or by a user to achieve various degrees of redundant storage of backup versions.

According to an additional aspect, the distribution component 106 can select one or more locations from storage locations 106 based upon a plurality of characteristics. For example, the plurality of characteristics can include a location (e.g., physical location, geographical location, relative location, etc.) of a storage location, network topology of a network connecting storage locations 106, storage capacity of a storage location, health of a storage location, or a type of storage location. It is to be appreciated that additional characteristics can be considered. For instance, availability, connectivity and/or bandwidth of a storage location can be utilized by the distribution component 104 to select storage locations. By way of example, the distribution component 104 can select a storage location that is near the client machine to retain a replica of the new backup version to facilitate faster retrieval that conserves network bandwidth.

It is to be appreciated that system 100 can include any suitable and/or necessary interface components (not shown), which provides various adapters, connectors, channels, communication paths, etc. to integrate the versioning component 102 and the distribution component 104, into virtually any application, operating and/or database system(s) and/or with one another. In addition, the interface components can provide various adapters, connectors, channels, communication paths, etc., that provide for interaction with and between the versioning component 102, the distribution component 104, storage locations 106 and/or component associated with system 100.

Figure 2:
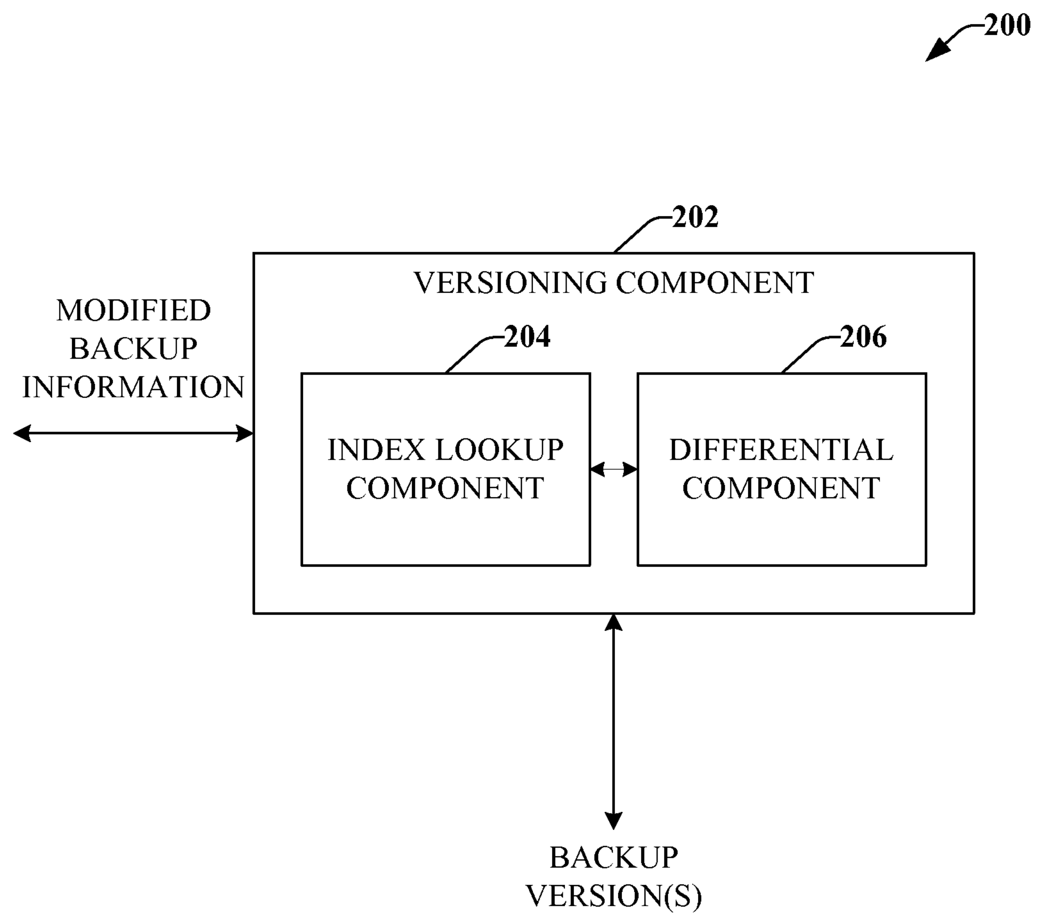
FIG. 2 illustrates a block diagram of an example system that facilitates generating versions of backup information in accordance with various aspects.

Turning now to FIG. 2, a system 200 for generating versions of backup information in accordance with various aspects is illustrated. As FIG. 2 illustrates, system 200 can include a versioning component 202, which can create backup versions (e.g., versions of backup information) based upon modifications made by a user to files or other information that corresponds to data managed by a backup system. It is to be appreciated that the versioning component 202 can be substantially similar to and/or perform substantially similar functions as versioning component 102 described with reference to FIG. 1. In one example, modified backup information (e.g., a file modified to be different from a most recent backed up edition) can be provided to the versioning component 202, which can generate a backup version(s) that reflects changes made by the user.

In accordance with an aspect, the versioning component 202 can include an index lookup component 204 that facilitates identification of backup information corresponding to the file or other information modified by the user. The index lookup component 204 can utilize an index, map, catalogue or other suitable metadata that specifies relationships between versions of backup information and corresponding storage locations to which the versions have been distributed. In addition, the index lookup component 204 can utilize other metadata that indicates properties of backup information managed by the backup system. For example, properties can include file names, file sizes, file types, file metadata (e.g., owner, notes, etc.), file permissions, file timestamps (e.g., creation date and time), file version indicator and the like. In one example, the index lookup component 204 can utilize the index and other metadata to identify versions of backup information previously backed up that correspond to the modified file.

According to an additional aspect, the versioning component 202 can include a differential component 206 that can generate a new backup version as an incremental update to previous versions of backup information. In one example, a differential between the modified file and a previous version can be generated to represent the incremental update. For instance, the modified file can be divided into segments (e.g., blocks, chunks, etc.). A signature or hash can be constructed for each segment. The signatures can be compared to signatures associated with segments of the previous version to determine segments that differ. A backup version can be created that includes segments of the modified file not included in the previous version, segments of the previous version that have been altered in the modified file, and/or segments of the previous version that have been removed in accordance with the modified file.

Figure 3:
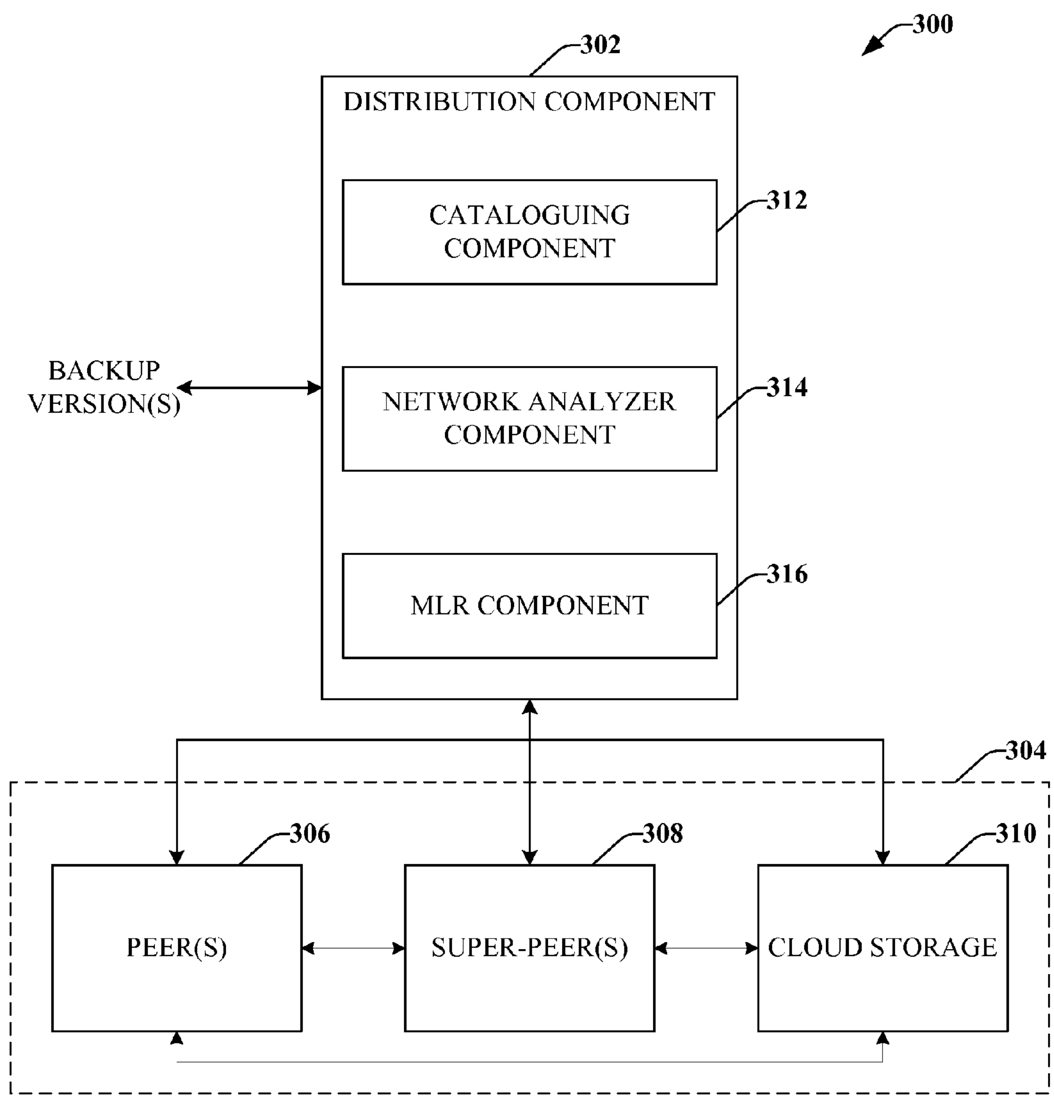
FIG. 3 illustrates a block diagram of an example system that facilitates distributing backup information versions across peers and an online storage environment in accordance with one or more aspects.

FIG. 3 illustrates a system 300 that facilitates distributing backup information versions across peers and an online storage environment in accordance with one or more aspects. System 300 can implement a hybrid cloud-based and peer-to-peer backup storage architecture. As FIG. 3, illustrates, system 300 can include a distribution component 302 that can distribute one or more backup versions. In one example, the one or more backup versions can be generated by a versioning component such as versioning component 102 or 202 as described supra with reference to FIGS. 1 and 2.

In accordance with one aspect, a hybrid peer-to-peer (P2P) and cloud based architecture can be utilized by system 300. For instance, distribution component 302 can disseminate new versions of backup information across storage locations 304. The storage locations 304 can include one or more trusted peers such as peer(s) 306 and/or super peer(s) 308, as well as one more cloud storage locations 310. As further illustrated in system 300, peer(s) 306, super-peer(s) 308, and/or cloud storage 310 can be further operable to communicate backup versions, and/or other backup information between each other. In addition, it can be appreciated that distribution component 302, and/or any other components of system 300 could additionally be associated with one or more peers 306, super-peers 308, or entities associated with cloud storage 3 10. Further detail regarding techniques by which peer(s) 306, super-peer(s) 308, and cloud storage 310 can be utilized, as well as further detail regarding the function of such entities within a hybrid architecture, is provided infra.

In an aspect, the distribution component 302 manages locality of backup versions among storage locations 304. The distribution component 302 allocates backup versions to various peers (e.g., peers 306, super peers 308) and/or cloud storage 310, wherein each peer or cloud storage location retains backup versions allocated thereto by the distribution component 302. The distribution component 302 can evaluate characteristics of storage locations 304 to provision backup versions amongst the locations. In one example, the distribution component 302 can distribute more backup versions to super-peers 308 (e.g., client machines with higher storage and connectivity capabilities) than to peers 306 (e.g., normal client machines).

In accordance with another aspect, distribution component 302 can include and/or otherwise be associated with a cataloguing component 312, which can maintain an index that lists relationships between backup versions and storage locations to which the backup versions have been distributed. In one example, the cataloguing component 312 can add, delete, and/or modify entries in the index when the distribution component 302 renders distribution and/or replication decisions regarding backup versions. In another example, the index can be distributed along with backup versions represented therein to one more peers 306, super peers 308, or cloud storage 310. It is to be noted without limitation or loss of generality that an entire index can be replicated and stored at one or more locations, or that an index can be divided and distributed, in chunks, among multiple locations.

In accordance with an additional aspect, distribution component 302 can further optionally include a network analyzer component 312, which can analyze a computing network associated with system 300 to determine one or more locations to distribute backup versions, indexes, index portions, or the like. In one example, network analyzer component 314 can select one or more destinations for information to be distributed based on network loading, availability of storage locations (e.g., based on device activity levels, powered-on or powered-off status, available storage space at respective locations, etc.), or the like. This can be done, for example, to balance availability of various data with optimal locality.

As system 300 further illustrates, a machine learning and reasoning (MLR) component 316 can additionally be employed by network analyzer component 314 to facilitate intelligent, automated selection of storage locations for respective information. In one example, MLR component 316 can utilize any suitable artificial intelligence (AI), machine learning, and/or other algorithm(s) generally known in the art. As used in this description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms (e.g., decision trees, neural networks, regression analysis, cluster analysis, genetic algorithm, and reinforced learning) to a set of available data (information) on the system. For example, one or more of numerous methodologies can be employed for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described herein.

Figure 4:
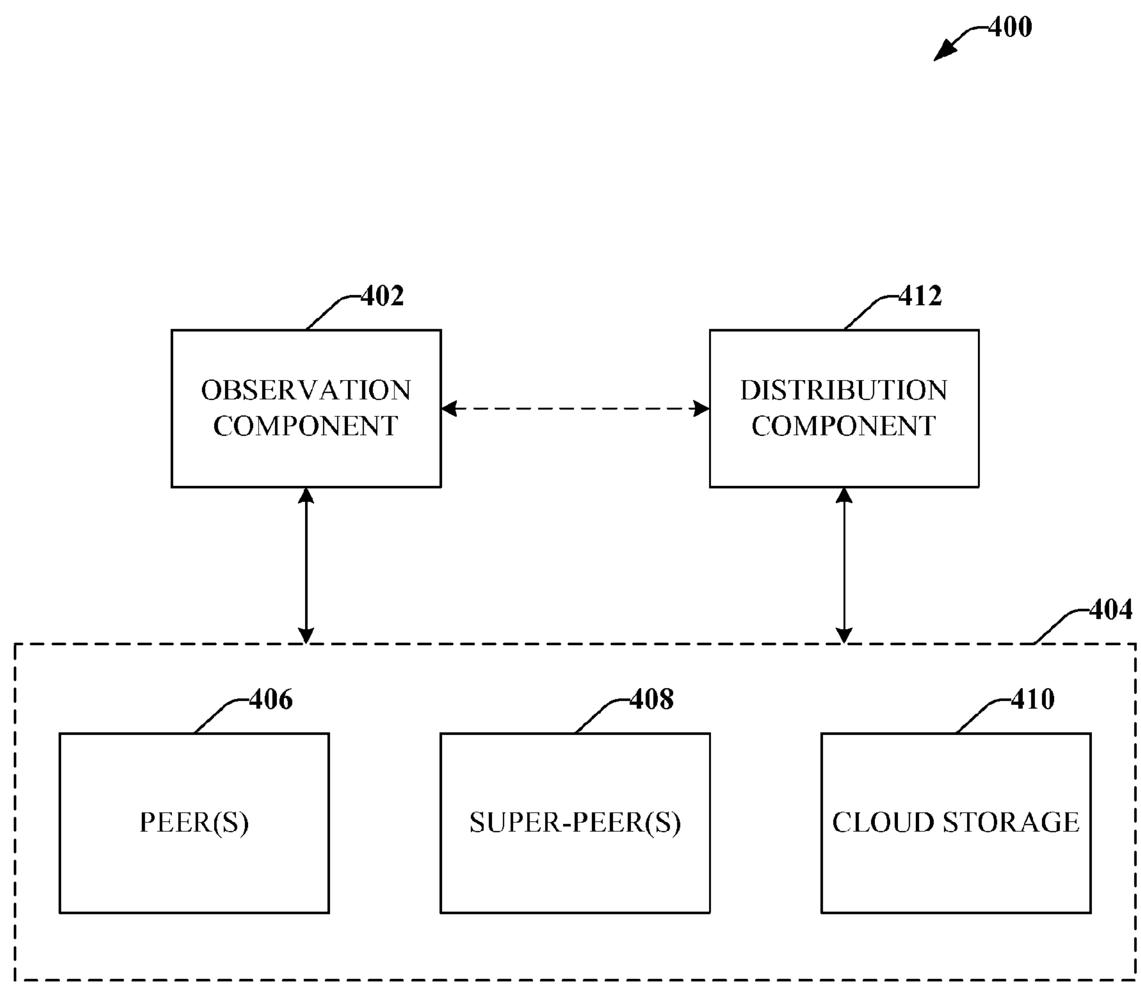
FIG. 4 illustrates a block diagram of an example system that facilitates monitoring storage locations to efficiently distribute and restore backup information versions in accordance with various aspects.

Referring to FIG. 4, illustrated is a system 400 that facilitates monitoring storage locations to efficiently distribute and restore backup information versions in accordance with various aspects. As depicted in FIG. 4, system 400 can include an observation component 402 that monitors a set of storage locations 404. The set of storage locations 404 can include peer(s) 406 (e.g., normal client machines), super-peer(s) 408 (e.g., client machines having greater storage, bandwidth, and connectivity), and cloud storage locations 410. While observation component 402 is depicted in FIG. 4 separate from peers 406, super-peers 408, and cloud storage 410, it is to be appreciated that the observation component 402 can include monitoring agents associated with each storage location. The monitoring agents can be responsible for monitoring and reporting status of a respective storage location to which the agent is associated.

In accordance with an aspect, the observation component 402 can monitor storage locations 404. In particular, the observation component 402 can track health, performance, available storage, available bandwidth, connectivity, overall availability, and/or availability of other resources of respective storage locations 404. The observation component 402 can convey monitoring results to a distribution component 412, which can efficiently replicate backup information (e.g., backed up files and data as well as multiple versions of backed up files and data). In one example, distribution component 412 can allocate more versions of backup information to storage locations determined, by the observation component 402, to have higher available storage. In another example, the distribution component 412 can distribute versions of backup information among storage locations 404 based upon monitoring data in terms of reliability. Backup versions can be replicated to provide reliable access to multiple version of backup information upon request.

In an aspect, the distribution component 412 can calculate an overall level of redundancy required to achieve reliability. In an example, a particular storage location can optimal in terms of locality to a client machine (e.g., a restoring client machine). However, the storage location can exhibit low availability. Accordingly, the distribution component 412 can select a secondary storage location to retain a redundant copy or copies of backup versions stored at the storage location. Such redundancy proves the client machine a guarantee that a backup version will be available for restoration from some storage location, if not always the optimal location.

In accordance with another aspect, the distribution component 412 can dynamically adjust distributions of backup versions based upon monitor results. The observation component 402 can continuously communicate monitor results related to storage locations 404 to the distribution component 412. In turn, the distribution component 412 can shift backup versions around the storage locations 404. In one example, the distribution component 412 can increase redundancy, decrease redundancy, remove backup versions from a location nearing storage capacity, allocating more backup versions to a location with increased storage availability, and the like.

Figure 5:
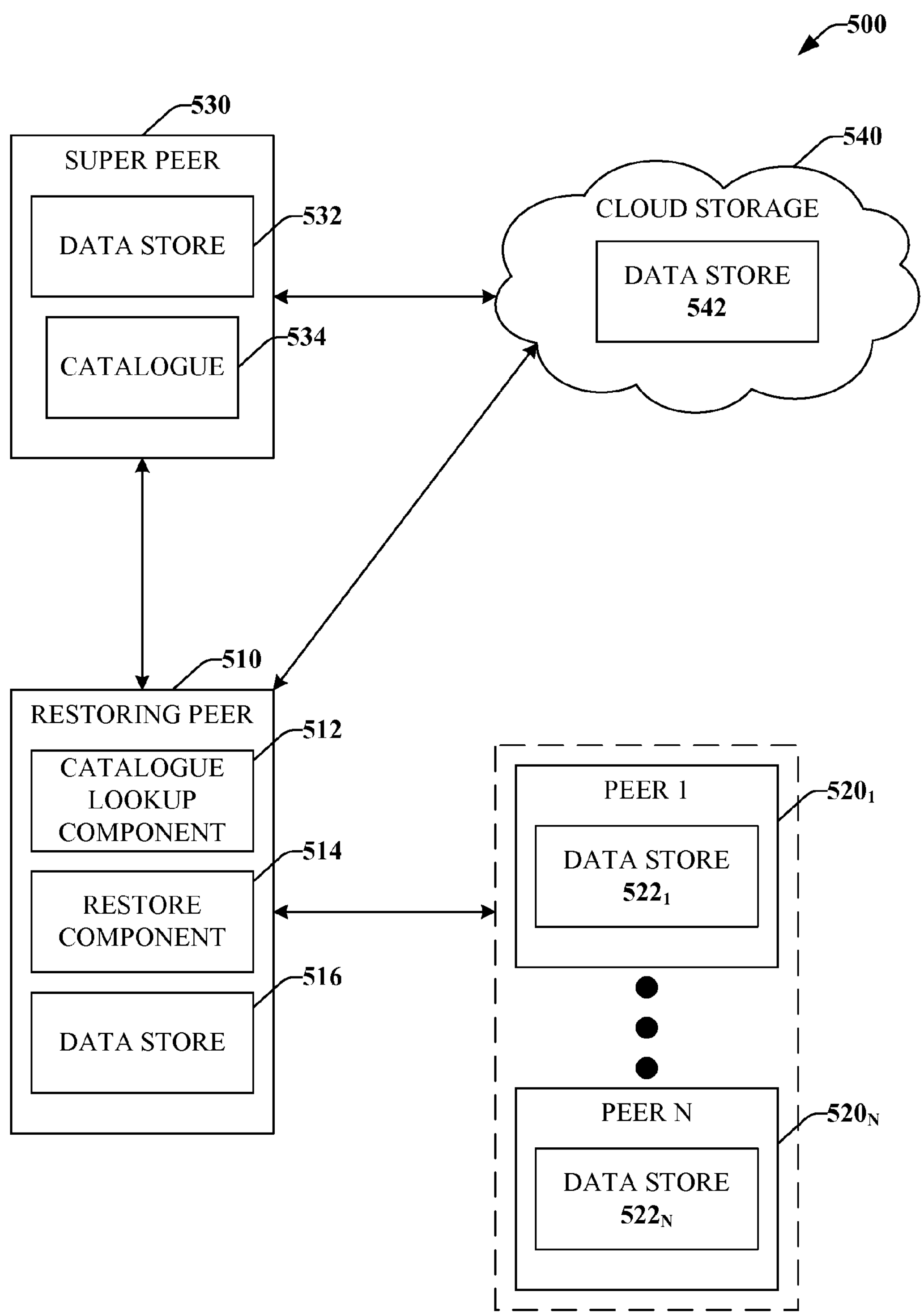
FIG. 5 illustrates a block diagram of an example system that facilitates conducting a restore in a hybrid cloud-based and peer-to-peer backup architecture in accordance with various aspects.

Referring now to FIG. 5, illustrated is a system 500 that facilitates conducting a restore in a hybrid cloud-based and peer-to-peer backup architecture in accordance with various aspects. As system 500 illustrates, a hybrid P2P/cloud backup architecture can be utilized, wherein backup information corresponding to one or more computing devices is distributed among one or more peers machines 510 or 520 and/or one or more super-peer machines 530, as well as one or more cloud storage locations 540.

In one example, peer machines 520 can include respective data stores 522, which can be utilized to receive and maintain backup information corresponding to one or more files or delta updates to respective files. Files and/or updates (e.g., backup versions) stored in data stores 522 can be associated with, for example, a restoring peer 510 (e.g., as created by a versioning component 102 and distributed by a distribution component 104). In addition, the restoring peer 510 can additionally or alternatively include a data store 516 for locally storing backup information corresponding to files and/or versions of files residing locally at restoring peer 510.

In another example, one or more super peers 530 in system 500 can additionally include a data store 532 as well as a catalogue 534, which can provide a master listing of file versions stored within system 500 and their respective locations (e.g., as created by an cataloguing component 312). Although catalogue 534 is illustrated as located at super peer 530 in system 500, it should be appreciated that some or all of catalogue 534 could additionally or alternatively be located at one or more peers 510 and/or 540 as well as at cloud storage 540.

In accordance with one aspect, the restoring peer 510 can include a restore component 514 that can issue a restore request. The restore request can be a request to roll-back a version of file retained by the restoring peer 510 with a previous version distributed in system 500. In another example, the restore request can be a command to recover a version (e.g., a most recent version, an original version and/or any version therebetween). A catalogue lookup component 512 can obtain metadata from catalogue 534 and/or any other suitable source that points to the respective locations of file versions to be restored.

Based on the locations obtained by catalogue lookup component 512, the restore component 514 can pull file versions from their corresponding locations within data store(s) 522, 532, 542, and/or any other suitable storage location within system 500. File versions can be complete entireties of files and/or incremental delta chunks that reflect changes between a version and an immediately previous version. Accordingly, in one example, a restore can be conducted by pulling incremental delta chunks necessary to recreate a desired version. In another example, a complete rendition of the desired version can be located and obtained.

In accordance with another example, the hybrid P2P/cloud backup architecture of system 500 can be exploited to minimize latency and/or bandwidth required to restore one or more file versions at a restoring peer 5 10. For example, restore component 514 can analyze system 500 to facilitate pulling of respective file versions from the path of least resistance through system 500. Thus, for example, in the event that a given file version resides at data store 522 or 532 at a peer 520 or super peer 530 as well as in cloud storage 540, preference can be given to pulling the block from the nearest network nodes first. As a result, a peer 520 and/or super peer 530 can be prioritized over cloud storage 540 to minimize the latency and bandwidth usage associated with communicating with cloud storage 540. In addition, restore component 514 can analyze availability of respective nodes in system 500, relative network loading and/or other factors to facilitate intelligent selection of nodes from which to obtain file versions. Accordingly, the restoring peer 510 can be configured to first attempt to obtain file versions from a peer machine 520 or a super peer 530, falling back on cloud storage 540 only if no peers 520 and/or 530 with required file versions are available. In an alternative example, super peer 530 and/or another entity from which the restoring peer 510 accesses catalogue 534 can utilize similar network analysis in order to select an optimal location from among a plurality of locations that retains a file version as indicated by the catalogue 534. Once selected, such location(s) can be subsequently provided to a restoring peer 5 10.

It is to be appreciated that the data stores illustrated in system 500 (e.g., data stores 516, 522, 532, and 542) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data stores can be a server, a database, a hard drive, a pen drive, an external hard drive, a portable hard drive, and the like.

Figure 6:
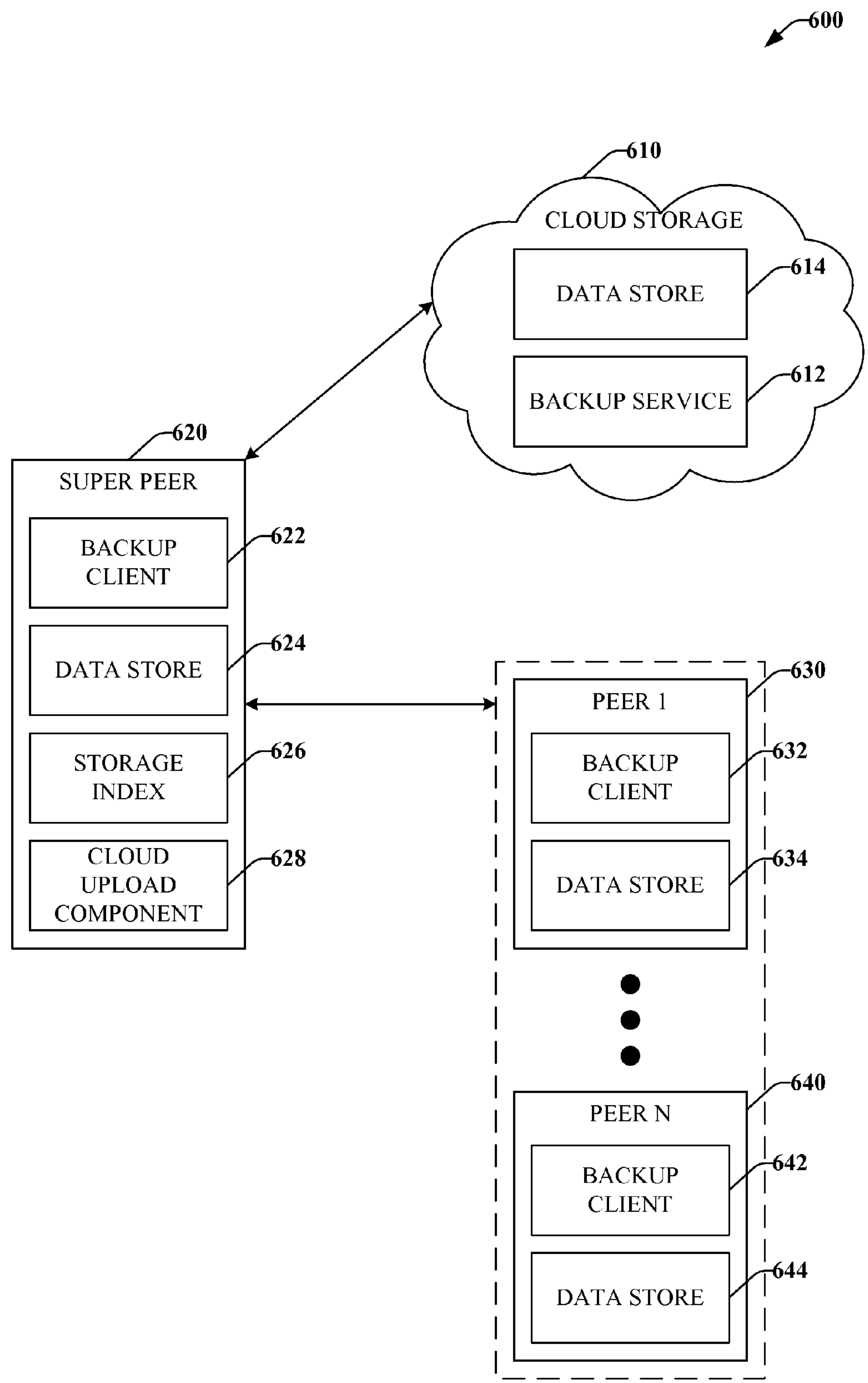
FIG. 6 illustrates a block diagram of an example network implementation that can be utilized in connection with various aspects described herein.

Referring next to FIG. 6, a diagram 600 is provided that illustrates an example network implementation that can be utilized in connection with various aspects described herein. As diagram 600 illustrates, a network implementation can utilize a hybrid peer-to-peer and cloud-based structure, wherein a cloud service provider 610 interacts with one or more super peers 620 and one or more peers 630-640.

In accordance with one aspect, cloud service provider 610 can be utilized to remotely implement one or more computing services from a given location on a network/internetwork associated with super peer(s) 620 and/or peer(s) 630-640 (e.g., the Internet). Cloud service provider 610 can originate from one location, or alternatively cloud service provider 610 can be implemented as a distributed Internet-based service provider. In one example, cloud service provider 610 can be utilized to provide backup functionality to one or more peers 620-640 associated with cloud service provider 610. Accordingly, cloud service provider 610 can implement a backup service 612 and/or provide associated data store 614.

In one example, data storage 614 can interact with a backup client 622 at super peer 620 and/or backup clients 632 or 642 at respective peers 630 or 640 to serve as a central storage location for data residing at the respective peer entities 620-640. In this manner, cloud service provider 610, through data storage 614, can effectively serve as an online "safe-deposit box" for data located at peers 620-640. It can be appreciated that backup can be conducted for any suitable type(s) of information, such as files (e.g., documents, photos, audio, video, etc.), system information, or the like. Additionally or alternatively, distributed network storage can be implemented, such that super peer 620 and/or peers 630-640 are also configured to include respective data storage 624, 634, and/or 644 for backup data associated with one or more machines on the associated local network. In another example, techniques such as de-duplication, incremental storage, and/or other suitable techniques can be utilized to reduce the amount of storage space required by data storage 614, 624, 634, and/or 644 at one or more corresponding entities in the network represented by diagram 600 for implementing a cloud-based backup service.

In accordance with another aspect, cloud service provider 610 can interact with one or more peer machines 620, 630, and/or 640. As illustrated in diagram 600, one or more peers 620 can be designated as a super peer and can serve as a liaison between cloud service provider 610 and one or more other peers 630-640 in an associated local network. While not illustrated in FIG. 6, it should be appreciated that any suitable peer 630 and/or 640, as well as designated super peer(s) 620, can directly interact with cloud service provider 610 as deemed appropriate. Thus, it can be appreciated that cloud service provider 610, super peer(s) 620, and/or peers 630 or 640 can communicate with each other at any suitable time to synchronize files or other information between the respective entities illustrated by diagram 600.

In one example, super peer 620 can be a central entity on a network associated with peers 620-640, such as a content distribution network (CDN), an enterprise server, a home server, and/or any other suitable computing device(s) determined to have the capability for acting as a super peer in the manners described herein. In addition to standard peer functionality, super peer(s) 620 can be responsible for collecting, distributing, and/or indexing data among peers 620-640 in the local network. For example, super peer 620 can maintain a storage index 626, which can include the identities of respective files and/or file segments corresponding to peers 620-640 as well as pointer(s) to respective location(s) in the network and/or in cloud data storage 614 where the files or segments thereof can be found. Additionally or alternatively, super peer 620 can act as a gateway between other peers 630-640 and a cloud service provider 610 by, for example, uploading respective data to the cloud service provider 610 at designated off-peak periods via a cloud upload component 628.

Figure 7:
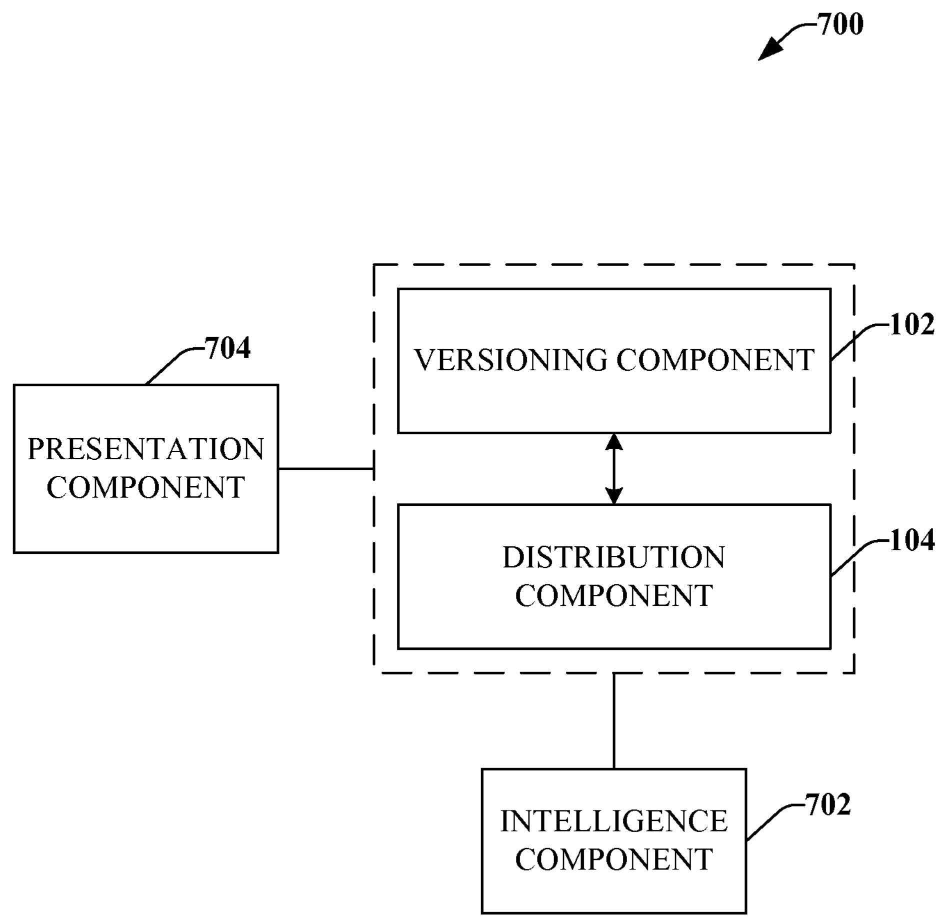
FIG. 7 illustrates a block diagram of an example system that facilitates generating and distributing backup data versions in accordance with various aspects.

FIG. 7 illustrates a system 700 that facilitates generating and distributing backup data versions in accordance with various aspects. The system 700 can include the versioning component 102 and distribution component 104 which can be substantially similar to respective components, boxes, systems and interfaces described in previous figures. The system 700 further includes an intelligence component 702. The intelligence component 602 can be utilized by the versioning component 102 and/or the distribution component 104 to infer, for example, a differential of a file version, a location of a file version, an optimal distribution of a file version, a level of redundancy of a file version, and the like.

The intelligence component 702 can employ value of information (VOI) computation in order to identify appropriate peers to identify optimal allocations of backup data amongst peers and to identify candidate backup data for shifting to cloud storage. For instance, by utilizing VOI computation, the most ideal and/or appropriate super peer designations and/or backup data allocations can be determined. Moreover, it is to be understood that the intelligence component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The versioning component 102 and/or the distribution component 104 can further utilize a presentation component 704 that provides various types of user interfaces to facilitate interaction between a user and any component coupled to system 700 (e.g., backup clients, backup service, etc.). As depicted, the presentation component 704 is a separate entity that can be utilized with the versioning component 102 and the distribution component 104. However, it is to be appreciated that the presentation component 704 and/or similar view components can be incorporated into the versioning component 102, the distribution component 104 and/or a stand-alone unit. The presentation component 704 can provide one or more graphical user interfaces (GUIs), command line interfaces, and the like. For example, a GUI can be rendered that provides a user with a region or means to load, import, read, edit etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the versioning component 102 and/or the distribution component 104 to select a level of redundancy of file versions distributed in the backup system.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 8:
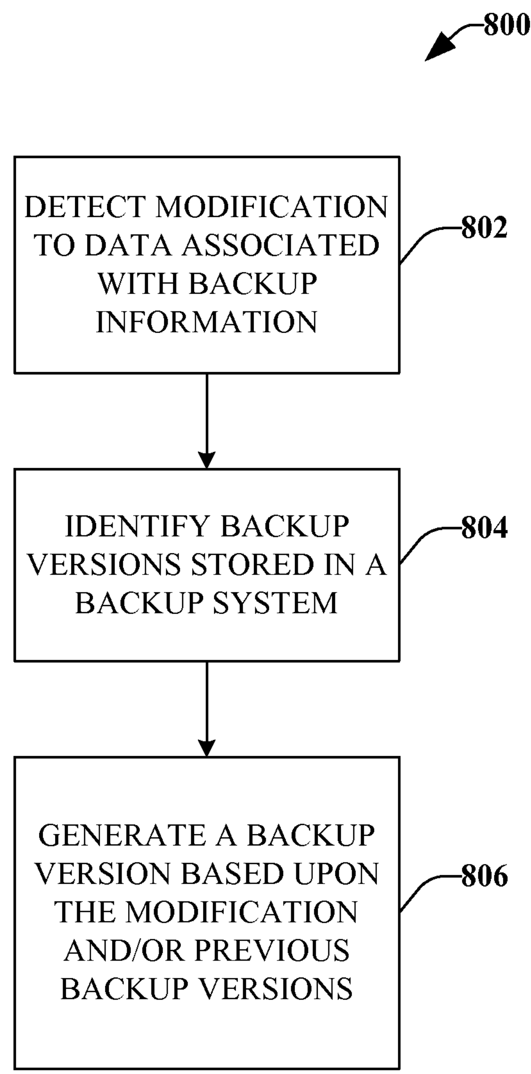
FIG. 8 illustrates an exemplary methodology for generating backup versions in accordance with various aspects.
Figure 9:
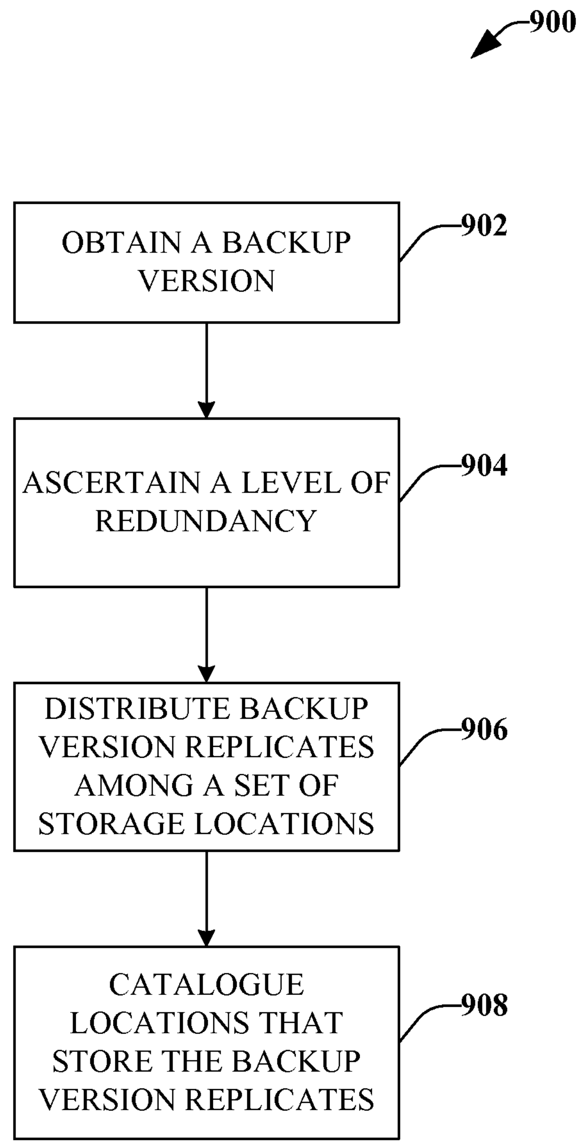
FIG. 9 illustrates an exemplary methodology for replicating backup versions in accordance with various aspects.

FIGS. 8-9 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 8, a method 800 generating backup versions is illustrated. At reference numeral 802, one or more modifications to data associated with backup information are detected. The data can be files and/or other data on a computer device with corresponding copies and/or versions stored in a backup system. At reference numeral 804, versions of the modified data can be identified in a backup system. An index can be utilized that maps backed up versions to locations within in the backup system. In one example, the backup system can be a hybrid peer-to-peer/cloud backup system. At reference numeral 806, a backup version is generated based upon the one more modification and/or previous versions stored in the backup system. For example, the new backup version can be created as an incremental update to previous versions of backup information. A differential between the modified file and a previous version can be generated to represent the incremental update. For instance, the modified file can be divided into segments (e.g., blocks, chunks, etc.). A signature or hash can be constructed for each segment. The signatures can be compared to signatures associated with segments of the previous version to determine segments that differ. A backup version can be created that includes segments of the modified file not included in the previous version, segments of the previous version that have been altered in the modified file, and/or segments of the previous version that have been removed in accordance with the modified file.

Turning now to FIG. 9, a method 900 for replicating backup versions is illustrated. At reference numeral 902, a backup version is obtained. The backup version can be a new version (e.g., an updated or modified version) of a file and/or other data retained in a backup system. At reference numeral 904, a level of redundancy is ascertained. In one example, the level of redundancy can be specified by a user. In another example, a level of redundancy can be intelligently selected. In an aspect, a set of storage locations (e.g., peers, super-peers, and/or cloud storage locations) can be monitored for availability, storage capacity, health, performance, and the like. Monitor results can be utilized to infer and/or statistically derive a level of redundancy required to enable reliable access to backup information versions. At reference numeral 906, backup version replicates can be distributed among a set of storage locations. In one example, a number of replicates can be in accordance with the level of redundancy desired. In addition, the replicates can be distribution to ensure reliable access. For instance, an optimal location (e.g., optimal in terms of locality, latency, and bandwidth resource utilization) can obtain a replicate. However, additional storage locations can obtain replicates as well to provide redundancy in situations where recovery is requested and the optimal location is unavailable. At reference numeral 908, locations in which backup version replicates have been distributed are listed in a catalogue. The catalogue can provide a mapping between a particular backup version and storage locations that respectively retain that backup version.

Figure 10:
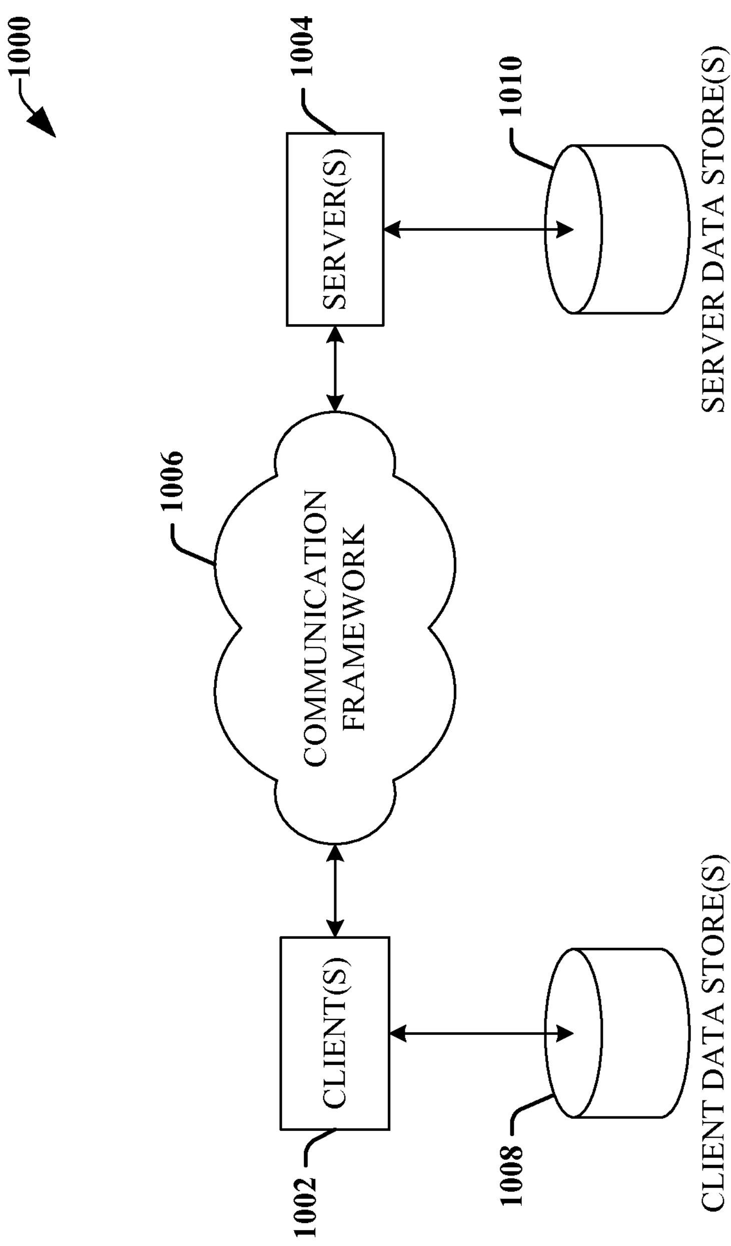
FIG. 10 illustrates an exemplary networking environment, wherein the novel aspects of the claimed subject matter can be employed.
Figure 11:
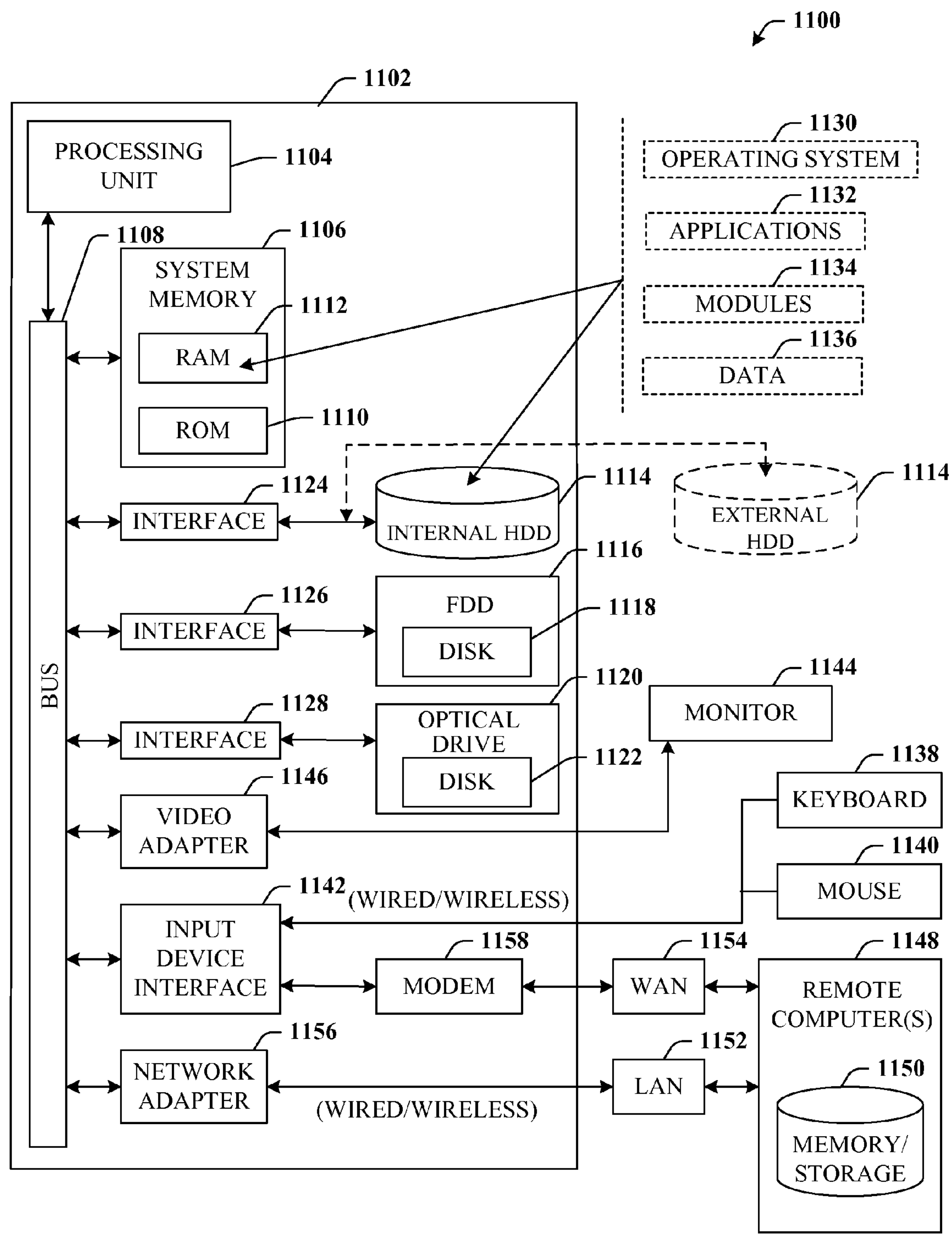
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For example, client machines such as peers and super-peers, as well as cloud storage locations can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). In one example, the client(s) 1002 can house cookie(s) and/or associated contextual information by employing one or more features described herein.

The system 1000 also includes one or more server(s) 1004. The server(s) 1004 can also be hardware and/or software (e.g., threads, processes, computing devices). In one example, the servers 1004 can house threads to perform transformations by employing one or more features described herein. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

With reference to FIG. 11, an exemplary environment 1100 for implementing various aspects described herein includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, a serial port, an IEEE-1394 port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates allocation of versions of backup information among a set of storage locations in a hybrid backup environment, the hybrid backup environment including both a cloud storage location of a cloud backup environment, and one or more peers of a peer-to-peer backup environment and one or more peer-to-peer storage locations of the peer-to-peer backup environment, comprising: a processor coupled to a memory that retains computer-executable instructions, the processor executes:

a versioning component that generates a version of backup information upon detection of a modification to data on a client machine corresponding to the backup information; and a set of storage locations in the hybrid backup environment, the set of storage locations including both a cloud storage location of the cloud backup environment and one or more peer-to-peer storage locations of the peer to peer backup environment, and a distribution component that replicates the version of backup information among the set of storage locations in the hybrid backup environment in accordance with each of (1) a level of redundancy of the version of backup information in both the cloud storage location of the cloud backup environment and the one or more peer-to-peer storage locations of the peer-to-peer backup environment, and (2) storage capacity of both the cloud storage location of the cloud backup environment and the one or more peer-to-peer storage locations of the peer-to-peer backup environment wherein the distribution component replicates the version of backup information among both the cloud storage location of the cloud backup environment and the one or more peer-to-peer storage locations of the peer-to-peer backup environment of the hybrid backup environment, and wherein the cloud backup environment and the peer-to-peer backup environment are configured to communicate the backup information between each other, and wherein the cloud storage location of the cloud backup environment is remote from the one or more peers of the peer-to-peer backup environment and the one or more peer-to-peer storage locations of the peer-to-peer backup environment and the cloud storage location is accessible to the one or more peers of the peer-to-peer backup environment via a network.

2. The system of claim 1, wherein the versioning component comprises an index lookup component that utilizes a catalogue to identify storage locations that retain one or more previous versions of the backup information.

3. The system of claim 1, wherein the versioning component comprises a differential component that generates an incremental update that includes delta changes between data as modified on the client machine and an immediate prior version of the backup information.

4. The system of claim 1, wherein the version of backup information comprises a complete rendition of the backup information.

5. The system of claim 1, wherein the distribution component comprises a network analyzer component that selects storage locations from the set of storage locations in the hybrid backup environment for replication of the version of backup information based on at least one of network loading or network availability of each of the set of storage locations.

6. The system of claim 1, wherein the distribution component includes a cataloguing component that maintains an index, the cataloguing component at least one of adds, deletes, or modifies entries in the index when distribution decisions are rendered by the distribution component.

7. The system of claim 6, wherein the index comprises a listing of relationships between backup versions and storage locations to which the backup versions have been distributed.

8. The system of claim 1, further comprising an observation component that monitors one or more storage locations to ascertain at least one of health of storage locations, storage availability of storage locations, performance of storage locations, available bandwidth of storage locations, or network availability of storage locations.

9. The system of claim 8, wherein the distribution component replicates the version of backup information based upon monitoring results obtained from the observation component.

10. The system of claim 9, wherein the distribution component selects the level of redundancy of the version of backup information in accordance with the monitoring results.

11. The system of claim 8, wherein the distribution component dynamically adjusts distribution of the version of backup information based upon monitor results continuously communicated by the observation component.

12. The system of claim 11, wherein the distribution component at least one of dynamically increases the level of redundancy of the version of backup information, dynamically decreases the level of redundancy of the version of backup information, de-allocates versions of backup information from a storage location in the hybrid backup environment, or allocates additional versions of backup information to a storage location in the hybrid backup environment.

13. The system of claim 1, wherein the level of redundancy is specified by user input.

14. The system of claim 1, wherein the distribution component replicates the version of backup information through application of a higher level of preference on storage locations corresponding to peers than to storage locations corresponding to cloud storage locations.

15. The system of claim 1, wherein the version of backup information comprises a version of a file.

16. A method for versioning backup information in a hybrid backup environment, the hybrid backup environment including both a cloud storage location of a cloud backup environment and one or more peers of a peer-to-peer backup environment and one or more peer-to-peer storage locations of the peer-to-peer backup environment comprising:

employing a processor executing computer-executable instructions stored on a computer-readable storage medium to implement the following acts:

generating a backup version that reflects alterations to backup information managed in a backup system;

replicating the backup version in accordance with each of a level of redundancy of the backup version in both the cloud storage location of the cloud backup environment and the one or more peer-to-peer storage locations of the peer-to-peer backup environment, and a storage capacity of both the cloud storage location of the cloud backup environment and the one or more peer-to-peer storage locations of the peer-to-peer backup environment, wherein the level of redundancy is one of statistically derived or specified by a user; and distributing replicate copies of the backup version to both the cloud storage location of the cloud backup environment and the one or more peer-to-peer storage locations of the peer-to-peer backup environment of the hybrid backup environment wherein the cloud storage location of the cloud backup environment is remote from the one or more peers of the peer-to-peer backup environment and the one or more peer-to-peer storage locations of the peer-to-peer backup environment and the cloud storage location is accessible to the one or more peers of the peer-to-peer backup environment via a network.

17. The method of claim 16, wherein generating the backup version comprises:

detecting a modification to a file corresponding to backup information managed in the backup system;

identifying versions of the backup information stored in the backup system; and creating a new backup version based at least in part on the modification or previous backup versions stored in the backup system.

18. The method of claim 16, further comprising:

monitoring both the cloud storage location of the cloud backup environment and the one or more peer-to-peer storage locations of the peer-to-peer backup environment to track at least one of health, performance, storage availability, bandwidth availability, or network availability of the monitored storage locations and dynamically adjusting distributions of copies of the backup version in accordance with the monitoring results.

19. A system that facilitates versioning backup information in a hybrid backup environment, the hybrid backup environment including both a cloud storage location of a cloud backup environment and one or more peers of a peer-to-peer backup environment and one or more peer-to-peer storage locations of the peer-to-peer backup environment comprising:

at least one processor that executes computer-executable code stored in memory to effect the following:

generating a version of backup information stored in a backup system based upon modifications to a file on a client machine corresponding to the backup information, wherein the version of backup information is one of an incremental differential that reflects the modifications to the file or a full rendition of the modified file;

a set of storage locations of the hybrid backup environment, the storage locations including both a cloud storage location of the cloud backup environment and one or more peer-to-peer storage locations of the peer-to-peer backup environment monitoring the storage locations, including monitoring of both the cloud storage location of the cloud backup environment and the one or more peers of a peer-to-peer backup environment of the hybrid backup environment, to track at least one of health, performance, availability of storage space, availability of bandwidth, or connectivity of both the cloud storage location of the cloud backup environment and the one or more peer-to-peer storage locations of the peer-to-peer backup environment distributing replica copies of the version of backup information among both the cloud storage location and the one or more peer-to-peer storage locations in accordance with each of a level of redundancy of the version of backup information statistically derived from monitor results, a storage capacity of each of the storage locations of the hybrid backup environment, and a type of each of the storage locations of the hybrid backup environment; and cataloguing, in an index, relationships between the version of backup information and storage locations that respectively retain a replica copy of the version of backup information, wherein the index is catalogued by dividing the index into sections and distributing the sections among one or more peers of the peer-to-peer backup environment and a cloud storage location of the cloud backup environment, wherein both the peer to peer backup environment and the cloud backup environment are included in the hybrid backup environment, and wherein the cloud storage location of the cloud backup environment is remote from the one or more peers of the peer-to-peer backup environment and the one or more peer-to-peer storage locations of the peer-to-peer backup environment and the cloud storage location is accessible to the one or more peers of the peer-to-peer backup environment via a network.

* * * * *